United States Patent
Besseling et al.

(10) Patent No.: US 11,555,772 B2
(45) Date of Patent: Jan. 17, 2023

(54) METHOD AND APPARATUS FOR IN-PROCESS PARTICLE SIZE DETERMINATION OF NANOSUSPENSIONS UNDER FLOW

(71) Applicant: InProcess IP B.V., Oss (NL)

(72) Inventors: Rut Besseling, Oss (NL); Ad Gerich, Oss (NL); Michiel Damen, Oss (NL)

(73) Assignee: InProcess IP B.V., Oss (NL)

( * ) Notice: Subject to any disclaimer, the term of this patent is extended or adjusted under 35 U.S.C. 154(b) by 397 days.

(21) Appl. No.: 16/955,070

(22) PCT Filed: Dec. 19, 2018

(86) PCT No.: PCT/NL2018/050859
§ 371 (c)(1),
(2) Date: Jun. 18, 2020

(87) PCT Pub. No.: WO2019/125155
PCT Pub. Date: Jun. 27, 2019

(65) Prior Publication Data
US 2020/0386662 A1    Dec. 10, 2020

(30) Foreign Application Priority Data

Dec. 20, 2017 (NL) ................................. 2020138

(51) Int. Cl.
*G06K 9/00* (2022.01)
*G01N 15/02* (2006.01)

(52) U.S. Cl.
CPC ............ *G01N 15/0211* (2013.01); *G01N 2015/0222* (2013.01)

(58) Field of Classification Search
None
See application file for complete search history.

(56) References Cited

U.S. PATENT DOCUMENTS

| | | | |
|---|---|---|---|
| 6,738,144 B1 | 5/2004 | Dogariu | |
| 6,958,816 B1 * | 10/2005 | Dogariu | G01N 21/49 356/479 |
| 2014/0322429 A1 | 10/2014 | Markl et al. | |

(Continued)

FOREIGN PATENT DOCUMENTS

EP    2270449 A1    1/2011

OTHER PUBLICATIONS

Weiss et al.; "Simultaneous and localized measurement of diffusion and flow using optical coherence tomography"; Feb. 9, 2015 | vol. 23, No. 3 | DOI:10.1364/OE.23.003448 | Optics Express 3448.

(Continued)

*Primary Examiner* — Wei Wen Yang
(74) *Attorney, Agent, or Firm* — Hoffmann & Baron, LLP (57) ABSTRACT

A method for monitoring a property of nanoparticles in a flowing suspension comprises providing a sample comprising a flowing suspension. The method further comprises non-invasively monitoring a size distribution of nanoparticles of the flowing suspension using Fourier domain low-coherence interferometry, FDLCI, wherein the monitoring comprises deriving a time and optical path length resolved LCI light scattering signal l(t,z) from time resolved LCI wavelength spectra of interference and deriving information indicative of the size of the particles in the sample based on said time and optical path length resolved LCI light scattering signal using optical path length resolved temporal autocorrelation functions or optical path length resolved frequency power spectra of the spatiotemporal FDLCI signal.

20 Claims, 6 Drawing Sheets

(56) References Cited

U.S. PATENT DOCUMENTS

2015/0369733 A1 12/2015 Izutani et al.
2017/0322133 A1* 11/2017 Trainer ............... G01N 21/474

OTHER PUBLICATIONS

Weiss et al.; "Localized measurement of longitudinal and transverse flow velocities in colloidal suspensions using optical coherence tomography", Physical Review E 88, 042312 (2013), DOI: 10.1103/PhysRevE.88.042312, PACS number(s): 83.85.Ei, 42.25.Kb, 83.50.Ha.

Bizheva et al.; "Path length-resolved dynamic light scattering in highly scattering random media: The transition to diffusing wave spectroscopy"; Physical Review E vol. 58, No. 6, Dec. 1998, PACS number(s): 32.70.Dd, 87.64.–t, 87.80+s, p. 7664-7667.

Boas et al.; "Using dynamic low-coherence interferometry to image Brownian motion within highly scattering media", Mar. 1, 1998 / vol. 23, No. 5 / Optics Letters, OCIS codes: 290.7050, 180.3170, 120.3180, 030.1640., p. 319-321.

Broillet et al.; "Optical coherence correlation spectroscopy (OCCS)", Jan. 13, 2014 | vol. 22, No. 1 | DOI:10.1364/OE.22.000782 | Optics Express 782.

Kalkman et al.; "Path-Length-Resolved Diffusive Particle Dynamics in Spectral-Domain Optical Coherence Tomography", DOI: 10.1103/PhysRevLett.105.198302, PACS Nos. 47.57.eb, 83.85.Ei.

Lee et al.; "Dynamic light scattering optical coherence tomography", 2012 Optical Society of America, OCIS codes: (110.4500) Optical coherence tomography; (110.4153) Motion estimation and optical flow; (180.6900) Three-dimensional microscopy; (170.3880) Medical and biological imaging, Sep. 24, 2012 / vol. 20, No. 20 / Optics Express, p. 22262-22277.

Leung et al.; "Particle-size and velocity measurements in flowing conditions using dynamic light scattering", Applied Optics / vol. 45, No. 10/Apr. 1, 2006, p. 2186-2190.

\* cited by examiner

METHOD AND APPARATUS FOR IN-PROCESS PARTICLE SIZE DETERMINATION OF NANOSUSPENSIONS UNDER FLOW

FIELD OF THE INVENTION

The invention relates to determining a particle size of colloidal suspensions. More particularly, the invention relates to a method and apparatus for non-invasive real-time in-process measurement of particle size distribution, flow and physical properties of flowing colloidal suspensions by optical path length resolved photon correlation spectroscopy.

BACKGROUND OF THE INVENTION

Synthesis and processing of nanoparticles/colloids (ranging in size from approximately 1-1000 nm) has become widespread in various industries over the last few decades due to the unique advantages nanoparticle (NP) products and formulations can offer. E.g. in the pharmaceutical industry, therapeutics formulated as NPs may offer better pharmacokinetic properties, controlled release and targeting. In food and cosmetics, colloids are also abundant, either occurring naturally or present through formulation. Due to increasing NP product development and production efforts and increasing demands for monitoring processes involving NPs, e.g. to characterize effects of process variations in development or to ensure quality during routine production, there is a growing need for inline noninvasive methods to characterize NPs during these processes, in particular NPs in suspension. In many cases, NP size and particle size distribution (PSD) are primary, if not critical, quality attributes. Methods for inline size characterization of NP suspensions during processing are therefore highly desired.

The common current practice for monitoring NP size or PSD in a process involves manual sampling of suspensions followed by off-line analysis. This has important disadvantages, e.g. excessive feedback times for process adjustments, risks of poor product quality or batch rejection, and uncertainties regarding measurement representativeness due to poor suspension stability after sampling and/or due to sample preparation. For unstable suspensions, offline analysis may even not be feasible altogether. Sampling may also entail risks of contamination or product sterility, product loss and high costs, further increasing the need for noninvasive, inline NP size characterization.

The methods currently available for offline (sample) analysis of particle size and PSD of NP suspensions are highly diverse, but offer limited or no opportunity for noninvasive use during suspension synthesis or processing. Examples are analytical centrifugation/photosedimentation, single-particle mass spectroscopy or other separation-based methods like size-exclusion chromotagraphy, which are intrinsically invasive. Most frequently used offline NP sizing techniques employ optical detection of the Brownian motion of suspended colloids, from which size characteristics can be obtained via the Stokes-Einstein relation. Best known among these techniques is Photon Correlation Spectroscopy (PCS) (Berne, B. & R. Pecora, 2000. *Dynamic Light Scattering: With Applications to Chemistry, Biology, and Physics*, Dover Publications), covering various methods in which the Brownian motion—and thus size—of an ensemble of suspended NPs is characterized by measurement of the temporal fluctuations and correlations of light scattered from the suspension. Other such methods are Nanoparticle tracking analysis (NTA, see e.g. U.S. Pat. Nos. 7,751,053 B2, 9,341,559 B2), which employs digital video microscopy techniques to track Brownian motion of many individual suspended NPs and, more recently developed, Differential Dynamic Microscopy, (R Cerbino, 2008. Phys. Rev. Lett. 100: 188102), an ensemble scattering method based on video microscopy that probes collective diffusion of colloids.

Other optical methods to detect the mean scattering signal (e.g. turbidity) or mean angular resolved scattering signal, instead of Brownian dynamics, also exists but these are typically suboptimal for measuring PSD in the colloidal size range (see e.g. U.S. Pat. Nos. 5,377,005, 6,831,741. and 5,438,408). For instance, these methods are indirect, requiring calibration by reference method and provide mainly average particle size information. In this context it should be emphasized that, in practice, preparation of adequate calibration materials (suspensions containing NPs of different known sizes) may be very complex or impossible. Another method is Photon Density Modulation (U.S. Pat. Nos. 5,818, 583 and 6,480,276), to which similar disadvantages apply.

The above described methods based on characterization of Brownian motion are essentially restricted to off-line analysis since (i) they require suspensions with low turbidity level (scattering coefficient $\mu_s \ll 1$ mm$^{-1}$ to prevent multiple scattering), different from turbidity levels typically encountered in industrial processes (ii) the methods require absence of flow in the suspensions, which is a major obstacle for inline analysis and (iii) analysis time for these methods is in the order of minutes at best, too slow for process monitoring and control.

A number of methods have been devised to overcome limitations regarding suspension turbidity. One example is cross-correlation PCS, which suppresses the multiple scattered light that results from measuring highly turbid media, but this method is unsuited for inline measurement. Another is Diffusing Wave Spectroscopy (DWS, see e.g. U.S. Pat. No. 6,831,741 and Pine, D. J. et al., 1990. Diffusing-wave spectroscopy: dynamic light scattering in the multiple scattering limit. *Journal de Physique*, 51(18), pp. 2101-2127) which on the other hand exploits multiple scattering. DWS may be configured for inprocess measurement, but provides only mean particle size information and is unable to deal with non-quiescent (flowing) suspensions under processing conditions.

Other inventions are based on different extensions of PCS for turbid media. U.S. Pat. No. 5,094,532 discloses performing PCS using a 'heterodyne' signal formed by mixing light backscattered from the sample with light reflected from the tip of a measurement probe. This 'heterodyne backscatter PCS' allows for the characterization of more concentrated suspensions compared to standard PCS, but is again unsuitable for non-quiescent (flowing) suspensions under processing conditions. EP 2 270 449 A1 discloses use of Low Coherence Interferometry (LCI) in PCS. LCI-PCS also measures a heterodyne interference signal, but employs as illumination low coherence light with a coherence length $\xi$ while backscattered light is mixed with reference light having traveled a controlled optical path length in a reference path. LCI provides a 'coherence gate' by which detection of light scattered from the sample is restricted to light with an optical path length equal to the controlled path length $\pm \sim \xi$. LCI-PCS fluctuation-correlation analysis at short fixed optical pathlengths, where single scattering applies, further improves PSD measurement in concentrated samples, but again is not suited for inline application to flowing NP suspensions.

U.S. Pat. No. 6,738,144 B1 discloses using LCI to measure photon path length distribution in a regime of multiple scattering for particles in the non-colloidal size range, diameter greater than about 2-5 µm.

So far there has been no method for realtime direct measurement of particle size distribution in the submicron (colloidal) size regime in a dynamic process environment with flow at process relevant timescales.

SUMMARY OF THE INVENTION

It is an object of the invention to provide an improved detection of colloidal particle characteristics in a suspension. This object is addressed by providing a method for monitoring a property of colloidal particles in a flowing suspension, comprising non-invasively monitoring at least one of a size and a size distribution of colloidal particles of the flowing suspension using Fourier domain low-coherence interferometry, FDLCI, wherein the monitoring comprises deriving a time and optical path length resolved LCI light scattering signal $l(t,z)$ from a time resolved LCI wavelength spectrum of interference, and deriving information indicative of the at least one of the size and the size distribution of the colloidal particles in the sample from at least one of an optical path length, z, resolved temporal autocorrelation function $G(\tau,z)$ of the time and optical path length resolved LCI light scattering signal $l(t,z)$ and an optical path length resolved frequency power spectrum $\tilde{G}(\omega,z)$ of the time and optical path length resolved LCI light scattering signal $l(t,z)$.

The time and optical path length resolved signal $l(t,z)$ resulting from FDLCI allows to take into account differences in the temporal fluctuations of the LCI signal resolved effectively simultaneously at different optical path lengths in the suspension. These different optical path lengths may correspond on average with different depths in the suspension from which photons are scattered. Therefore, the effect of flow, which may be different at such different depths, may be isolated from the temporal fluctuations due to Brownian motion and compensated for when calculating particle size and PSD in the suspension. The method may thus provide non-invasive inline particle size and PSD characterization of flowing colloidal suspensions in industrial applications, e.g. during synthesis in batch reaction vessels (in which the suspension may be circulated during a process) or in continuous processes. Further, the inline size and PSD characterization may be performed without calibration by reference method and independent of the concentration of the colloidal particles. Additionally, the high-speed acquisition enabled by FDLCI along with rapid processing of the optical path length resolved data allow the characterization to be performed at process-relevant timescales.

Information indicative of the size distribution of the colloidal particles may be obtained from at least one optical path length (z) resolved temporal autocorrelation function $G(\tau,z)$, wherein $\tau$ represents a lag time, of the time and optical path length resolved LCI scattering signal $l(t,z)$, or, equivalently, at least one power spectrum $\tilde{G}(\omega,z)$, wherein $\omega$ represents a frequency, of the time and optical path length resolved LCI scattering signal $l(t,z)$. The autocorrelation functions or power spectra characterize the temporal fluctuations of $l(t,z)$ caused by simultaneous flow and Brownian motion of the suspended particles. An object of the invention is to provide a method to isolate and characterize the signal fluctuations associated with Brownian motion and thereby extract particle size characteristics of the flowing suspension.

The person skilled in the art will understand that the features described above may be combined in any way deemed useful. Moreover, modifications and variations described in respect of the system may likewise be applied to the method and to a computer program product, and modifications and variations described in respect of the method may likewise be applied to the system and to the computer program product.

BRIEF DESCRIPTION OF THE DRAWINGS

In the following, aspects of the invention will be elucidated by means of examples, with reference to the drawings. The drawings are diagrammatic and may not be drawn to scale. Throughout the drawings, similar items have been marked with the same reference numerals.

DETAILED DESCRIPTION OF EMBODIMENTS

Certain exemplary embodiments will be described in greater detail, with reference to the accompanying drawings.

The matters disclosed in the description, such as detailed construction and elements, are provided to assist in a comprehensive understanding of the exemplary embodiments. Accordingly, it will be apparent that the exemplary embodiments can be carried out without those specifically defined matters. Also, well-known operations or structures are not described in detail, since they would obscure the description with unnecessary detail.

In the present description, several examples and embodiments of an optical path length resolved low coherence photon correlation spectroscopy method and apparatus are disclosed. These may allow to monitor simultaneously at least one of particle size distribution, flow, and optical properties of colloidal suspensions noninvasively, for example during their synthesis and/or processing in real time. Moreover, the method and apparatus may be designed and employed without a need for calibration by reference methods.

In certain embodiments, the mean particle size and particle size distribution may be obtained without calibration or knowledge of suspension properties (e.g. concentration of the colloidal particles) beforehand. Additionally, it is possible to measure both at high concentrations and during flow, making the method suitable for industrial suspensions and inline application. The method may employ fast FDLCI to obtain the optical path length resolved scattering signal $l(t,z)$ from scattering particles in a fluid, resolved effectively instantaneously at each time t and at a high sampling frequency. This involves known techniques of obtaining, from the FD-Low Coherence Interferometer, the spectrum $l(t,\lambda)$ at time t and wavelength $\lambda$ of the mixture of reflected reference light and light backscattered from the suspension, and several signal processing steps including inverse Fourier transformation to yield the complex optical path length resolved FDLCI signal $l(t,z)$. Although the method is herein described using the complex optical path length resolved FDLCI signal $l(t,z)$, it is also possible to achieve the same result by using the modulus. In such a case, the remainder of the method would be performed analogously. According to the present disclosure, the method may obtain from $l(t,z)$ the correlation function $G(\tau,z)$ or power spectrum $\hat{G}(\omega,z)$ and obtain from this information a mean particle size distribution, flow and scattering properties at process-relevant time scales from analysis of data at relevant optical path lengths in the suspensions. From the z-resolved data, the maximum optical path length in the suspension for which single scattering characteristics apply may be analyzed automatically and thereby the range of optical path lengths suitable for single scattering analysis may be enhanced and, correspondingly, signal levels improved. Thus, accurate particle size characterization for low to high concentration may be achieved within a few seconds. A further advantage of measuring backscattered light may be that it reduces the relative scattering intensity from large particles, which for other angles may dominate the signal and may limit the PSD resolution. Regarding inline PSD analysis, the present disclosure provides an apparatus and analysis method by which the effect of flow on the z-dependent scattered signal fluctuations can be measured and accounted for to provide PSD analysis even in dynamic process conditions without pausing flow for measurement or sampling.

Figure 1:
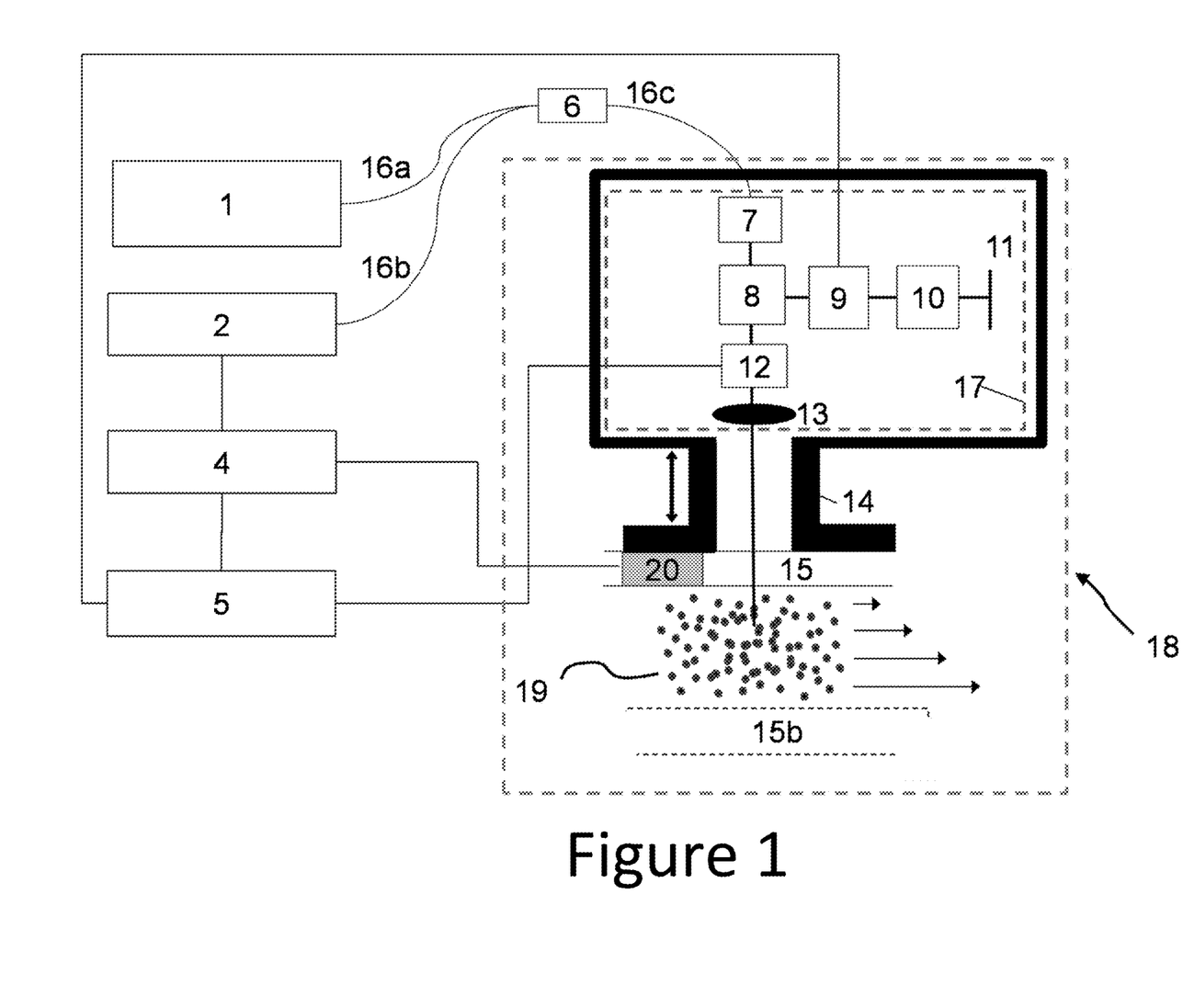
FIG. 1 shows a diagram of a Fourier Domain low-coherence interferometry acquisition device and processing device.

FIG. 1 shows a schematic illustration of an FDLCI apparatus. The apparatus may comprise the following components. Light Source 1 provides low temporal coherence (broadband), high spatial coherence light. It may be a supercontinuum light source or a superluminescent diode (or combination of multiple sources) characterized by a center wavelength $\lambda_c$ and a bandwidth (typically taken as Full Width Half Maximum FWHM) of $\Delta\lambda_c$. Low temporal coherence of the source is preferable to create the spatial 'coherence gate' of LCI by which the final backscattered light can be resolved for specific optical path lengths. The center wavelength $\lambda_c$ (which may differ from the maximum intensity wavelength for an asymmetric source spectrum) can be in the range of 300-2000 nm, preferably between 500 and 1500 nm. The bandwidth $\Delta\lambda_c$ may be a few hundred nm, typically at least 50 nm to provide sufficient resolution for the final optical path length resolved signal. In a specific implementation example, the source center wavelength may be $\lambda_c=1300$ nm and the bandwidth may be FWHM=170 nm.

The light of the light source 1 may be coupled into a fiber 16a and guided through the directional element 6. This directional element 6 may comprise an optical circulator or isolator and serves to guide the returning light into the spectrometer unit 2 and prevent it from re-entering in the source 1. The source light is subsequently coupled into the fiber collimator or fiber focuser 7 of the interferometer unit 17.

The spectrometer 2 receives and detects the mixed backscattered and reflected light through the directional element 6. In a typical configuration light from the fiber 16b is collimated into a beam which is directed onto a grating or other dispersing element and using appropriate optics directed onto a linear camera/diode array detector (such as a charge-coupled device, CCD or a complementary metal-oxide-semiconductor, CMOS) with an appropriate acquisition frequency. The maximum acquisition frequency determines (along with inter alia optics and sample scattering properties) the minimum particle size and maximum flow that can be measured reliably. Acquisition frequency may be, in a particular implementation, about 50 kHz. Alternatively, when using a swept wavelength light source instead of, for example, a broadband super luminescent diode (SLD) source, a single balanced detector may be used instead of a dispersing element/array detector.

A data acquisition and processing unit 4 may comprise standard acquisition hardware (such as a framegrabber, data acquisition card and the like) and at least one known data processing unit such as CPU, GPU (Graphics Processing Unit) or FPGA (Field Programmable Gate Array). The at least one processing unit may be configured to receive the acquired spectral interferometry data from the spectrometer unit 2 and perform, inter alia, primary and/or secondary processing on the data. Data processing may comprise primary processing in which each raw LCI interference spectrum (i.e. the LCI signal strength for each wavelength at time t) is transformed into the corresponding optical path length resolved complex LCI signal $l(t,z)$ involving dc-background subtraction and standard processing steps including inverse Fourier Transformation.

The secondary data processing steps may include evaluation of the optical path length (z) resolved autocorrelation functions $G(\tau,z)$ or equivalently, power spectra $\hat{G}(\omega,z)$, of $l(t,z)$, iterative data fitting to quantify the z-dependent flow induced contributions to $G(\tau,z)$ or $\hat{G}(\omega,z)$ and thereby quantify the suspension flow profile, performing a flow correction on $G(\tau,z)$ or $\hat{G}(\omega,z)$, extract autocorrelations $g_B(\tau,z)$ or frequency power spectra $\hat{g}_B(\omega,z)$ representative of Brownian motion and analyze the Particle Size distribution based on a suitable optical path length average $\langle g_B(\tau) \rangle$ of $g_B(\tau,z)$, or $\langle \hat{g}_B(\omega) \rangle$ of $\hat{g}_B(\omega,z)$. Both primary and secondary processing steps may be performed using CPU, GPU or FPGA based computing to provide measured properties at shorter time scales (depending on implementation and hardware, for example in the range of about 5 to 60 seconds). Parallel computing and/or multithreading may be used to further reduce these time scales.

A Control Unit 5 may transform outputs of the data processing (such as scattered intensity, particle size and polydispersity index, PDI) into two sets of electrical signals. One set may control data acquisition settings (e.g. frequency) and measurement settings of the interferometer (e.g intensity of the reference arm light). The other set may represent measured physical properties of the suspension or a difference between a measured property and a target property, particularly PS, PDI and PSD, to control and/or adjust the operating parameters by which the suspension is synthesized or processed, for example in order to keep these properties on target. The operating parameters may include any one or more of temperature, reactant concentration, stir rate in batch process, or various upstream/downstream process parameters in a flow-through continuous process.

Interferometer Unit 17 may be implemented in a measurement probe 18. The interferometer unit 17 may comprise a fiber collimator or focuser 7. Additionally, the interferometer unit 17 may comprise various other components, such as a beam splitter 8, attenuator 9, dispersion compensation or focusing lens 10, reflecting element 11, controllable shutter 12, and focusing lens 13. For example, the interferometer unit 17 may comprise a fiber collimator 7, a beam splitter 8, focusing lens 10, reflecting element 11, controllable shutter 12 and focusing lens 13, or alternatively, a fiber focuser 7, a beam splitter 8, reflecting element 11 and controllable shutter 12. In a typical example in which a Michelson configuration with beam splitter is employed (main part of the measurement probe 18) the low coherence illumination, after being collimated by fiber collimator 7, is divided into a reference path and a sample path by the beam splitter 8. The beam in the reference path is partly reflected by a reflecting element 11 (e.g. a mirror or retroreflecting prism) and recombined in beam splitter 8 with the returning light in the sample arm, resulting from backscattering or reflection in the sample. The resulting interference between reflected reference path and sample path light provides the information on Brownian dynamics of the NPs and can be used to analyze the sample properties. The reference path may include a tunable attenuator 9 to control the reference beam intensity relative to that of the sample beam to optimize signal detection when in-process measurements are performed on a suspension stream with evolving particle size and optical/scattering properties. The reference arm also may contain a lens to focus the reference beam on e.g. a mirror 11, or a dispersion compensation element or focusing lens 10 to match the dispersion encountered in the sample arm.

The sample arm of the interferometer 17 may contain a means, such as controllable shutter 12, or a galvo-mirror deflecting light away from the sample, to allow measurement of light and the source spectrum as returned from the reference path only. Similarly, attenuator 9 may cancel the reference beam so only the spectrum of scattered light from the sample is measured. These separate spectra may be employed periodically for background subtraction in the primary data processing.

Further the sample arm may contain a lens 13 focusing the beam into the sample. The focus position can be set to optimize the signal to noise ratio and may be controlled by a program, wherein said program may be executed by control unit 5, for example. The reference arm optical path length of the interferometer 17 may be set somewhat less than the optical path length to the interface between the sample window 15 and the suspension 19.

Alternatively, the reference light with fixed optical path length may also comprise light being reflected from the interface between sample window 15 and the suspension or another fixed partly reflecting surface positioned between the lens 13 and the suspension 19. In such geometry the traditional separate reference arm, and beam splitter 8 and shutter 12 may be omitted, since the generation and mixing of the reflected reference light and scattered light from the sample both occur in the sample arm.

Optical fibers 16a-c may be up to several meters in length to be able to locate the components 1, 2, 4 and 5 away from the measurement probe 18 in a process situation.

While the current example describes an interferometer unit employing a Michelson interferometer, other types of interferometer implementations such as Mach-Zender may also be used.

The focal control and connection 14 and the sample window 15 may form an interface for the light between the lens 13 and the suspension 19. The interface may provide a fixed connection between the interferometer unit's 17 focal control mechanism and the transparent window 15 providing the suspension boundary. The alignment may be such that the optical axis of the sample arm is perpendicular to the direction of the flow. A temperature sensor 20 may be included in the flow cell to provide local temperature of the suspension in the flow-through device, to be used in the analysis.

Figure 2:
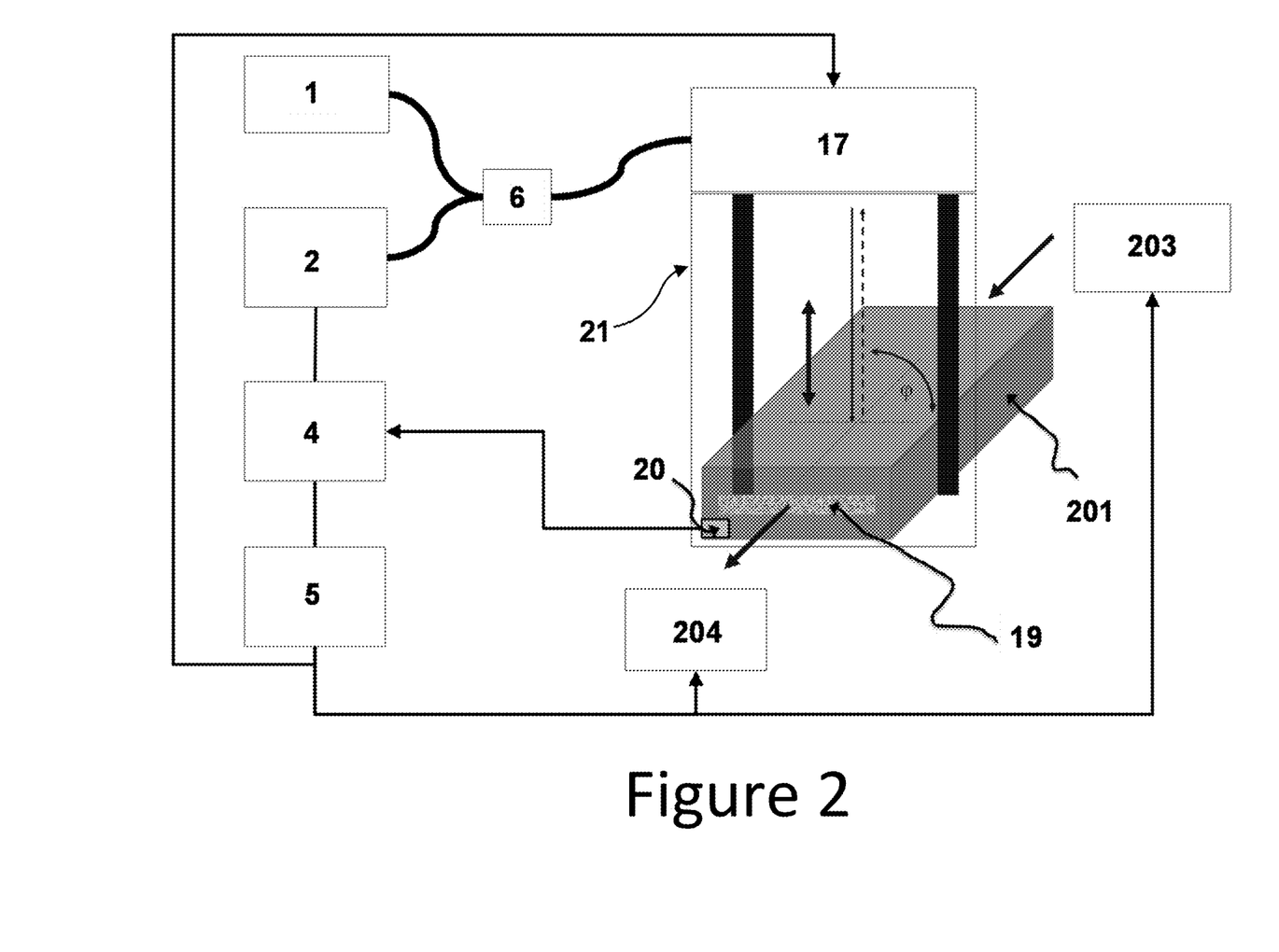
FIG. 2 shows a diagram of a low-coherence interferometry acquisition device and processing device applied to a flow cell.

FIG. 2 illustrates an in-process realization of the apparatus for non-invasive real-time suspension monitoring and process control in a continuous process. The figure shows a flow cell 201 (which may be implemented by means of a tube) through which a suspension 19 flows in the direction indicated by arrows. The flow cell 201 is made at least in part of, or has a window made of, a transparent material, to allow the interferometer 17 to transmit light into and receive light from the suspension 19 through the wall of the flow cell 201. Also, FIG. 2 shows that the control unit 5 can control upstream process parameters 203 and downstream process parameters 204.

In the realization illustrated in FIG. 2, the interferometer 17 may be coupled to a device 21, such as a focus control device, containing flow cell 201. The dimensions of the flow cell may be designed for specific range of throughputs to accommodate measurement within accessible speed range for PSD analysis. The device 21 may be included to adjust the depth of the focal point of the light leaving the interferometer relative to the flow cell 201. Further, the angle $\varphi$ between optical axis and inner cell surface may be set at 90 degrees or different to avoid strong surface reflections. A temperature sensor 20 may be included in the flow cell to provide local temperature of the suspension in the flow-through device, to be used in the analysis.

Figure 3:
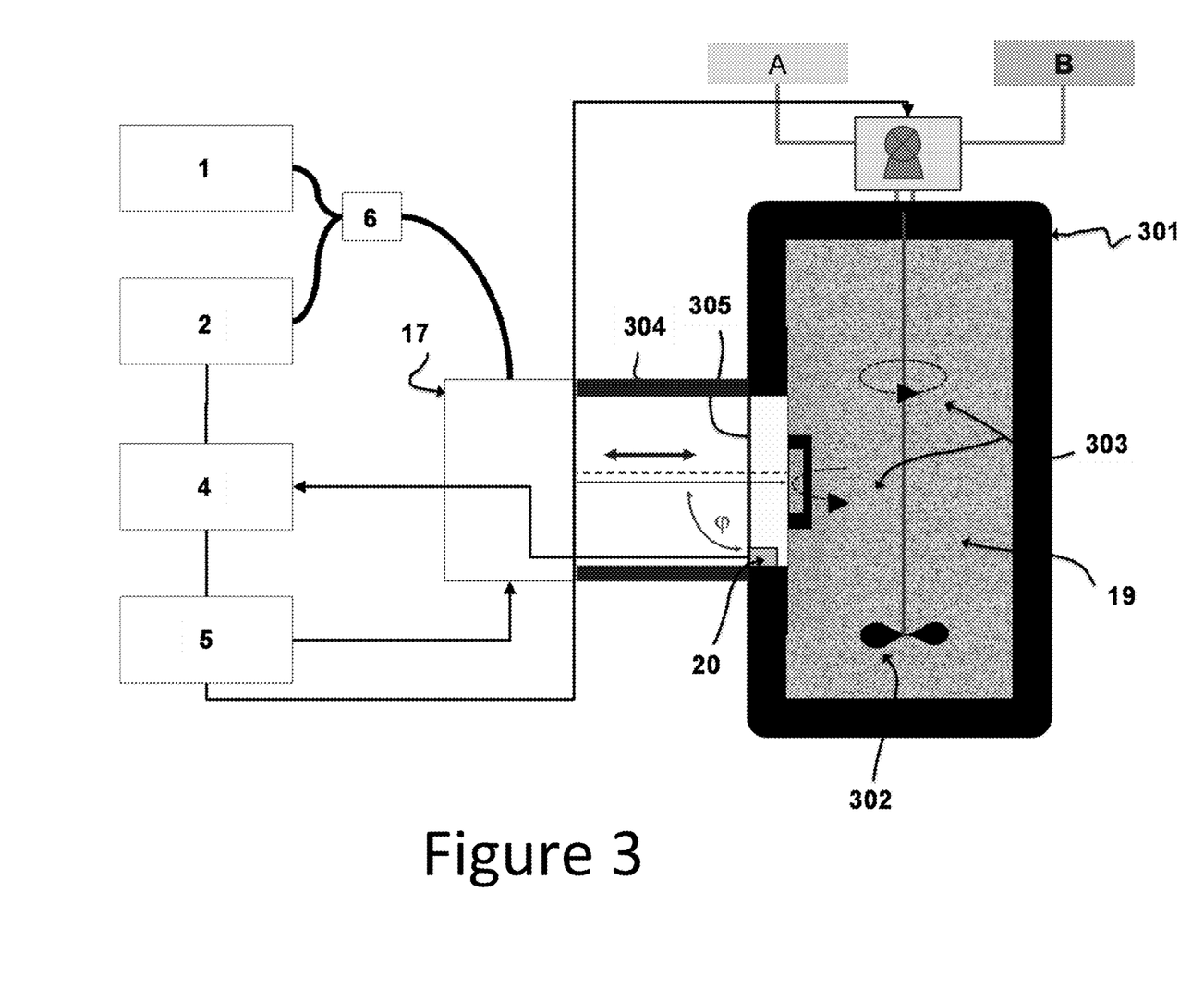
FIG. 3 shows a diagram of a low-coherence interferometry acquisition device and processing device applied to a reaction vessel.

FIG. 3 shows a schematic drawing of an apparatus for non-invasive real-time suspension monitoring and process control in a batch processing operation. As shown, the interferometer 17 is coupled to a reaction-vessel 301 adaptor 304, containing a window 305 for optical access which may be flush with the inner wall of the reaction vessel and have attached to it means for guidance/alignment of local flow in the form of a channel through which suspension can move in a laminar fashion in controlled direction to allow measurement in highly turbulent flows. A temperature sensor 20 may be integrated with the window 305. The reaction vessel 301 may comprise a vessel, as shown, and may have an agitating means such as a stirrer. The stirrer may comprise, for example, rotor blades 302 that may cause the suspension 19 to circulate within the reaction vessel 301, in the direction indicated by means of arrows 303, so that the window 305 gives a view to the flowing suspension. Means to set the focal point position and to tune the angle between the window and the optical axis may be provided.

In an embodiment similar to that of FIG. 3, the interferometer unit 17 and window 305 which may have attached to it at least one of a flow guidance device, temperature sensor 20 and adaptor 304, may be implemented in a compact unit forming a probe that can be inserted in the reaction vessel 301 to perform measurement of the suspension stream deeper in the vessel away from the reaction vessel wall.

The different realizations of the apparatus may be used to realize direct integration in suspension synthesis/processing setups, and together with data analysis performed using, for example, parallel computing methods, may provide 'real-time' particle size distribution data. Various alternative constructions will be apparent to the person skilled in the art, which will still fall within the scope of the present invention.

For analysis of LCI data, I. Popov, A. S. Weatherbee, and I. A. Vitkin, "Dynamic light scattering arising from flowing Brownian particles: analytical model in optical coherence tomography conditions," *J. Biomed. Opt.*, vol. 19, no. 12, p. 127004, 2014, and J. Lee, W. Wu, J. Y. Jiang, B. Zhu, and D. A. Boas, "Dynamic light scattering optical coherence tomography," *Optics Express*, vol. 20, no. 20. p. 22262, 2012, have disclosed a theory about the LCI signal in presence of flow and Brownian diffusion of particles of a single size. This theory does not describe poly-disperse suspensions. The present disclosure provides an extension to poly-disperse suspensions, which are the most relevant and common suspensions from an (industrial) application point of view.

In FDLCI, the signal $l(t,\lambda)$ at the detector for each wavelength $\lambda$ of the light source (i.e. the spectrum at time t), results from interference of the electro-magnetic field of the reflected reference beam and that scattered from the ensemble of NPs in the suspension. Due to Brownian or other motion of the NPs, the signal $l(t,\lambda)$ has temporal fluctuations that are characteristic of the NP dynamics. The actual optical path length resolved signal $l(t,z)$ in FDLCI is the complex Fourier transform of $l(t,k)$, with $k=2\pi/\lambda$, k being the wavenumber. For single scattering, a specific optical path length z represents a specific depth in the suspension and temporal fluctuations of $l(t,z)$ reflect NP motion in a coherence volume at that depth. In this case one can show that, for a suspension of NPs with a distribution of sizes, the correlation function $G(\tau,z)=<l(0,z)l^*(\tau,z)>$, ($\tau$ represents a lagtime, '*' represents a complex conjugate and < > a time average) in quiescent conditions where only Brownian motion of NP's (denoted by subscript B') causes temporal fluctuations of $l(t,z)$, may be closely approximated by:

$$G_B(\tau>0,z)=\gamma(z)g_B(\tau,z)=\gamma(z)\int_0^\infty F_z(\Gamma_B)K(\Gamma_B\tau,\xi)d\Gamma_B \quad \text{Equation (1)}$$

$$\text{with } K(\Gamma_B\tau,\xi)=\Sigma_{p=-1}^{p=1}L_{p,\xi}\exp(-\Gamma_B\tau(1+p\alpha_\xi)) \quad \text{Equation (2).}$$

Equation (1) assumes low Numerical Aperture optics (e.g. lens 13) and many noninteracting NPs in the coherence volume. Amplitude factor $\gamma(z)$ is set by the optical system, detector properties and sample scattering properties, while $g_B(\tau,z)$ reflects Brownian motion and characterizes the local particle size distribution via the Stokes-Einstein relation along with the right-hand side of Equation (1). In the latter, $\Gamma_B=D_r(4\pi n/\lambda_c)^2$ is the decorrelation rate of the LCI signal scattered from NPs with hydrodynamic radius r (with $D_r$ the diffusion coefficient, n the solvent refractive index and $\lambda_c$ the source centre wavelength in vacuum). Further, $F_z(\Gamma_B)$ is the fraction of the signal $l(z)$ scattered from NPs with radii for which $\Gamma_B$ is in the range $[\Gamma_B, \Gamma_B+d\Gamma_B]$ and thus represents a PSD. The form $K(\Gamma_B\tau,\xi)$ describes decay of the autocorrelation for a single particle size. The parameters $\alpha_\xi$, $L_{p,\xi}$ in Equation (2) (with p an integer) depend on the coherence length $\xi$ and can be derived from results in [Popov]. For $\xi>\sim 4$ μm, $\alpha_\xi$, $L_{\pm 1, \xi}$ become negligible such that $K(\Gamma_B\tau,\xi)=\exp(-\Gamma_B\tau)$ and the right-hand side of Equation (1) becomes the standard Laplace transform of $F_z(\tau_B)$.

For a suspension under flow, the FDLCI signal $l(t,z)$ has additional temporal fluctuations due to the mean flow of NPs, which typically depends on depth in the suspension. Calculations show that for a z-dependent flow velocity $v_x(z)$ transverse to the optical axis and $v_z(z)$ along the optical axis, G may be closely approximated by:

$$G(\tau>0,z)=\gamma(z)g_B(\tau,z)g_{F,x}(\tau,v_x(z))g_{F,z}(\tau,v_z(z))$$

$$\text{with } g_{F,x}=\exp[-(\Gamma_x(z)\tau)^2] \quad \text{Equation (3)}$$

Here $g_B(\tau,z)$ is the term representing Brownian motion and the PSD, as described in Equation (1). The term $g_{F,x}(\tau,v_x(z))$ arises from transverse flow, characterized by a Gaussian with decay rate $\Gamma_x(z)=v_x(z)/w$ with $v_x(z)$ the local transverse velocity and w the (optical system specific) effective beam waist at focus. The last term $g_{F,z}(\tau,z)$ represents the effect of flow along the optical axis. The z-resolved FDLCI-PCS data combined with Equation (3) allow to characterize local flow and speed variation that typically occurs over the depth from which scattered light is acquired during inline measurement. In contrast to standard PCS, in which effects of flow and Brownian motion are mixed and averaged, the contributions $g_B(\tau,z)$ needed for particle sizing may thus be extracted from $G(\tau,z)$ by accounting for the flow.

Alternatively, in an analogous method in which the modulus $|l(t,z)|$ of $l(t,z)$ is used, the corresponding intensity correlation $G^{(2)}(\tau,z)=<|l(0,z)||l(\tau,z)|>/<|l(z)|>^2$ may be related to $G(\tau>0,z)$ in Equations (1) and (3) via the standard Siegert relation.

In principle, analysis of $G(\tau,z)$ near the suspension-confining window boundary (located at $z=z_{Bound}$, where generally zero flow $v(z_{Bound})=0$ applies and $g_{Fx,z}=1$) already yields a measure for the relevant Brownian contribution $g_B(\tau)$ of $G\tau(t,z)$ and thus for particle size and PSD. However, the signal to noise ratio may be drastically improved when information from $z>z_{Bound}$ (corrected for the effect of flow) is included. In arbitrary flow, analysis of $g_B(\tau,z)$ for polydisperse suspensions is highly challenging, but for frequently occurring laminar, quasi-steady local flows, which may be orthogonal to the LCI beam, both the Brownian and transverse flow contribution to the autocorrelations can be extracted from $G(\tau,z)$ via Equation (3). Besides suitable optical arrangement and flow interfacing, the present disclosure for particle sizing during flow provides for a data-analysis scheme, using for example Equation (3) and averaging of $g_B(\tau,z)$ via $$\langle g_B(\tau) \rangle = \frac{\int_{z_B}^{z_B+z_{ss}} \gamma(z)g_B(\tau, z)dz}{\int_{z_B}^{z_B+z_{ss}} \gamma(z)dz} \quad \text{Equation (4)}$$

to extract the mean Brownian contribution $<g_B(\tau)>$ from $G(\tau,z)$.

For quiescent suspensions, multiple scattering causes z-dependence of $g_B(\tau, z)$ when the optical path length in the suspension $(z-z_{Bound})$ exceeds a maximum optical path length $Z_{ss}$ characteristic for single scattering. The characteristic optical path length $Z_{ss}$, related to the photon mean free path (MFP, typically $Z_{ss}\sim 5\text{-}10\times \text{MFP}$) is in itself an important suspension property and can thus be determined from the optical path length dependence of measured FDLCI temporal fluctuations. For a suspension under flow, $Z_{ss}$ can be obtained from an iterative data analysis/fitting scheme, hence $<g_B(\tau)>$ may be determined for $z-z_{Bound}<Z_{ss}$ as in Equation (4), which ensures that $<g_B(\tau)>$ represents only single scattered light and thus may be used to analyse a mean PSD (expressed as $<F(\Gamma_B)>$) via Equation (1). In practice, when $z_{Bound}\approx 0$, the autocorrelations $g_B(\tau, z)$ are independent of optical path length z when $z<Z_{ss}$.

Figure 4:
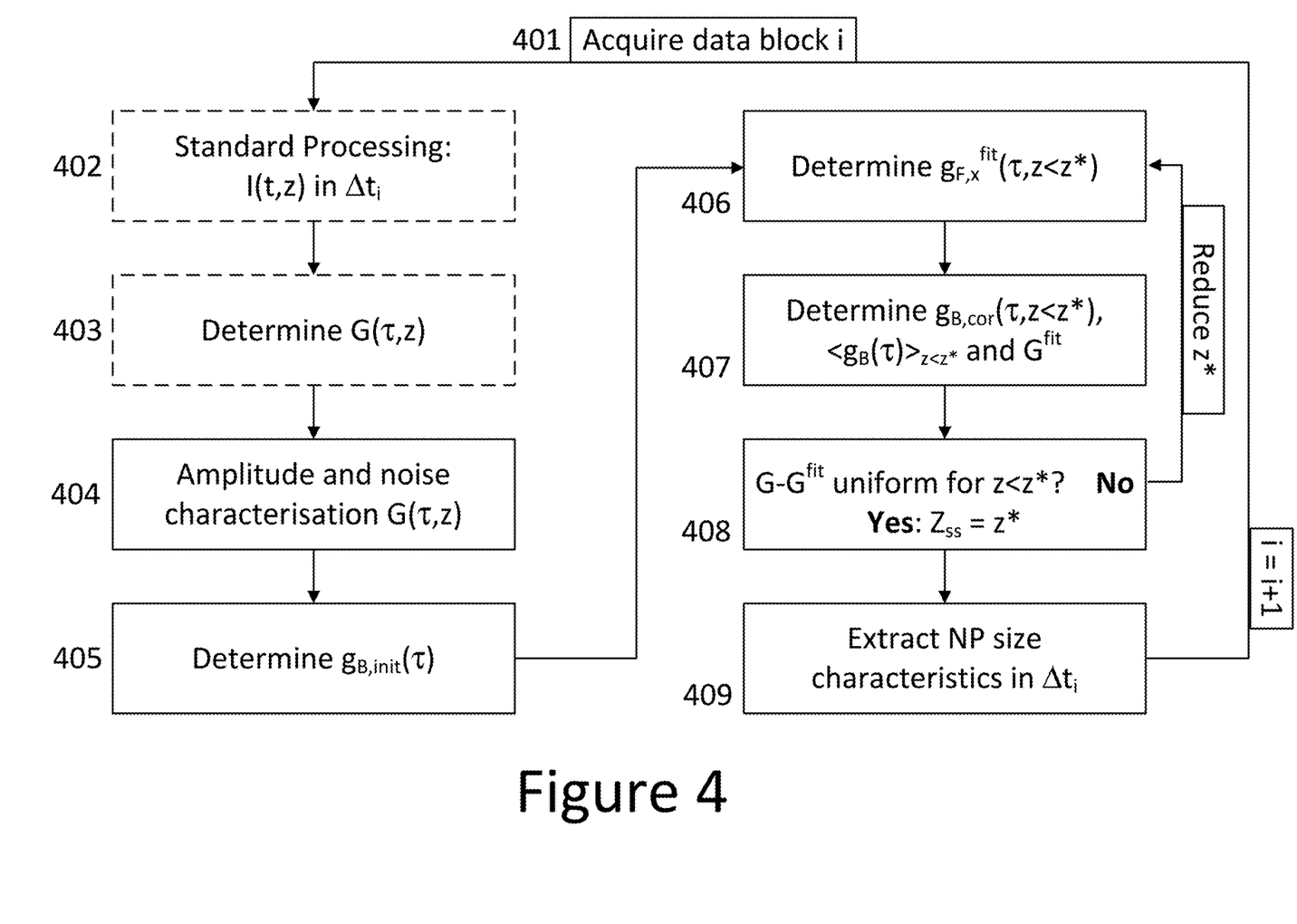
FIG. 4 shows a flowchart of a method of analyzing interferometry data.

FIG. 4 shows a flowchart of a method of acquisition and analysis of the interferometry data. The overall scheme presented in the figure describes continuously repeated cycles of acquisition and analysis of subsequent data blocks i, for measurements in continuous mode during monitoring of a NP synthesis/processing operation. However, it is also possible to perform the acquisition and analysis of a single data block, to obtain information once. As illustrated in FIG. 4, after acquisition of a block of FDLCI spectra over a time interval $\Delta t_i$ in step 401, standard processing may be performed in step 402, which may include performing an inverse Fourier transform, providing the optical path length resolved LCI scattering signal $l(t,z)$ for each acquired time point tin the time interval and each relevant optical path length z in the range of measured optical path lengths. In step 403, the z-resolved autocorrelation function $G(\tau,z)$, or alternatively, the z-resolved frequency power spectrum $\hat{G}(\omega,z)$ is computed.

In step 404, analysis from $G(\tau,z)$ of '$\tau=0$ intercepts' $\gamma(z)$, the noise level $<G(\tau\to\infty, z)>$ and the depth $z^*$ where signal vanishes, as well as statistical analysis of $G(\tau,z)$ evaluated over data sub-blocks within the interval $\Delta t_i$ to assess steady character of the signal, may be performed. In other words, characterization of the amplitude and noise of $G(\tau,z)$ is performed.

In step 405, initial analysis of $G(\tau, z)$ for optical path lengths z within a narrow range of the suspension boundary at $z_{Bound}$ where the zero-velocity condition $v(z=z_{Bound})=0$ applies, may be performed. This provides the initial estimate $g_{B,init}(\tau)$ for the Brownian contribution to the autocorrelation $G(\tau,z)$.

In step 406, fitting of the z-dependent flow induced contribution $g_{F,x}(\tau,\Gamma_x(z))$, and thus the flow profile, using for example Equation (2) with as input the spectra $G(\tau, z<z^*)$, the '$\tau=0$ intercept' $\gamma(z<z^*)$ and setting $g_B(\tau,z)=g_{B,init}(\tau)$ (the initial spectrum), may be performed. Lagtime $\tau'(z)$, where residuals exceed a limit, may be recorded. Low order polynomial fit of the obtained $\Gamma_x(z<z^*)$ may yield an analytical description $v_x^{fit}(z<z^*)$ of the flow and an associated analytical form $g_{F,x}^{fit}(\tau,z<z^*)$ for the contribution to the decorrelation $G(\tau, z<z^*)$ due to flow.

In step 407, a corrected form of the Brownian part of the autocorrelation, $g_B^{cor}(\tau,z<z^*)$ is obtained from Equation (3), using $\gamma(z<z^*)$ and the analytical flow correction $g_{F,x}^{fit}(t, z<z^*)$. Subsequent weighted, partial averaging of $g_B(\tau<\tau'(z), z<z^*)$ e.g. as in Equation (4) within the determined lagtime limit $\tau'(z)$ may provide an intermediate result for the average Brownian part $<g_B(\tau)>$ of the autocorrelation function.

In step 408, analysis may be performed of residuals $\varepsilon(\tau,z)=G(\tau, z<z^*)-G^{fit}(\tau, z<z^*)$ with $G^{fit}(\tau, z)=<g_B(\tau)>\gamma(z) g_{F,x}^{fit}(\tau,z)$. When $\varepsilon(z)$ is determined to exhibit a systematic variation, the result $g_B^{cor}(\tau,z<z^*)$ may be considered to be depth dependent (indicating e.g. multiple scattering). As indicated at 408, in that case steps 406 to 408 may be repeated with reduced $z^*$, for example until depth independence is achieved for $z^*=Z_{ss}$.

In step 409, evaluation of mean particle size, polydispersity and/or particle size distribution from $<g_B(\tau)>$ may be performed. This evaluation may be based on, for example, cumulant analysis, CONTIN Laplace inversion, or other known methods by which information about $<F(\Gamma_B)>$ is extracted from $<g_B(\tau)>$ via Equation (1). In addition, number based particle size distribution n(r) may be extracted from the primary distribution $<F(\Gamma_B)>$ using standard Mie theory. Resulting data, which may include the measured scattering length $Z_{ss}$ and 'raw data' $G(\tau,z)$ or $\hat{G}(\omega,z)$ from block i, may be stored for statistical process control purposes during monitoring.

The above described embodiment of the analysis scheme employs the autocorrelation $G(\tau,z)$ of the FDLCI signal. However, an analysis may also be performed instead using the optical path length resolved frequency power spectra $\hat{G}(\omega,z)$ from which the mean power spectrum of the Brownian contribution to the fluctuating FDLCI signal, $<\hat{g}_B(\omega)>$ may be obtained. The analysis of the flow contribution—starting from an initial Brownian power spectrum $\hat{g}_{B,init}(\omega)$ for optical path lengths near the flow boundary—may involve deconvolution of $\hat{g}_{F,x}(\omega,z)$ from $\hat{G}(\omega,z)$ followed by fitting $\Gamma_x$ using the corresponding Gaussian form for $\hat{g}_{F,x}(\omega, z)$, determining $v_x(z)$ from a low order polynomial fit to $\Gamma_x(z)$, re-analysis of $\hat{g}_B(\omega,z)$ and averaging over $Z_{ss}$ (obtained similarly as in the time-domain analysis) to yield $<\hat{g}_B(\omega)>$ from which PSD may be obtained using standard methods.

While the main objective of the analysis in the invention is direct measurement of particle size and a PSD from $G(\tau,z)$ or $\hat{G}(\omega,z)$, other characteristics of $G(\tau,z)$ or $\hat{G}(\omega,z)$, e.g. parameters describing their time (or frequency) and optical path length dependence obtained by empirical fitting, may also be used to characterize the flowing suspension for process monitoring or control.

Certain embodiments may comprise a computer program, which may be used to control a computer, control unit, or processor, that may automatically control acquisition settings of the FDLCI instrument and adapt these in response to measured signals (e.g. reference intensity ratio, acquisition frequency) to monitor the time-dependent properties of the colloidal suspensions. In addition the program may be configured to perform the described correlation analyses, perform data fitting, and obtain the relevant properties. The program may incorporate parallel processing to perform these calculations in real time, which, for relevant processes, may mean that the analysis of a data block would be in the range of about 5 to 60 seconds. Using the measured particle size or PSD information or other characteristics obtained from the LCI signal, a control signal may be set that determines one or a number of relevant process parameters. In particular, the signal may be a trigger signal indicating for example that mean particle size or width of the distribution exceeds certain limits.

The program can be implemented as a computer readable command code in any suitable programming language. The program element may be stored on a computer readable medium such as CD ROM, DVD, Blu-ray Disk, removable drive, volatile and non-volatile memory etc. Further, the program element may be provided in a network, for example the Internet, and may be downloaded from a user on demand.

The techniques disclosed herein may be applied in, for example, a nano-milling process. A nano-milling process is a continuous milling process wherein relative large particle are milled to nano-particles of a defined size and distribution. The inline measurement system may be equipped with a flow-cell adaptor that can provide continuously real-time information regarding particle size and distribution, using the measurements and computations disclosed elsewhere in this disclosure. This information can be used as feedback or feedforward control to adjust, for example, the milling speed, to stop the process or to continue if the target specifications are not (yet) reached. Without the inline monitoring possibility, samples can only be measured off-line by stopping the process and taking a sample or, if possible, to withdraw a sample from the recirculation chamber. In such cases, significant delays in feedback to the process would exist since the offline sample has to be analyzed externally and will need sample preparation before analysis. When close to the target specification, the continuous monitoring data allows to perform the process non-stop and to stop the process when appropriate.

A second process control example is monitoring of the formation of liposomes for a pharmaceutical process by extrusion. Liposomes may be formed by forcing of specific lipids through an extrusion filter. To obtain similarly sized liposomes a number of extrusion cycles may be applied. By integration of the present invention in such a process, the actual particle size, polydispersity and PSD can be assessed in real time and the process can be adjusted, continued or stopped based on this information.

A third process control example wherein the non-invasive character and fast analysis capabilities of the invention are both advantageously applied, is the monitoring of nano-suspensions as end-product in vials or syringes during a filling and stoppering process. A direct quality control of the end-product becomes possible by measurement through the sample vials or syringes. The obtained data can either be used for process adjustments or for confirmation of quality of the end-product and for real-time release.

Some or all aspects of the invention may be suitable for being implemented in form of software, in particular a computer program product. The computer program product may comprise a computer program stored on a non-transitory computer-readable media. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be executable by one or more processors. Such processor is an example of a control unit.

The examples and embodiments described herein serve to illustrate rather than limit the invention. The person skilled in the art will be able to design alternative embodiments without departing from the spirit and scope of the present disclosure, as defined by the appended claims and their equivalents. Reference signs placed in parentheses in the claims shall not be interpreted to limit the scope of the claims. Items described as separate entities in the claims or the description may be implemented as a single hardware or software item combining the features of the items described.

Examples

The invention is now described in further detail through a number of examples in which nanoparticle suspensions were characterized in different inline conditions with varying levels of flow. Aqueous suspensions of calibrated polystyrene (PS) nanoparticles purchased from Kisker Biotech were used for these purposes.

Figure 5A:
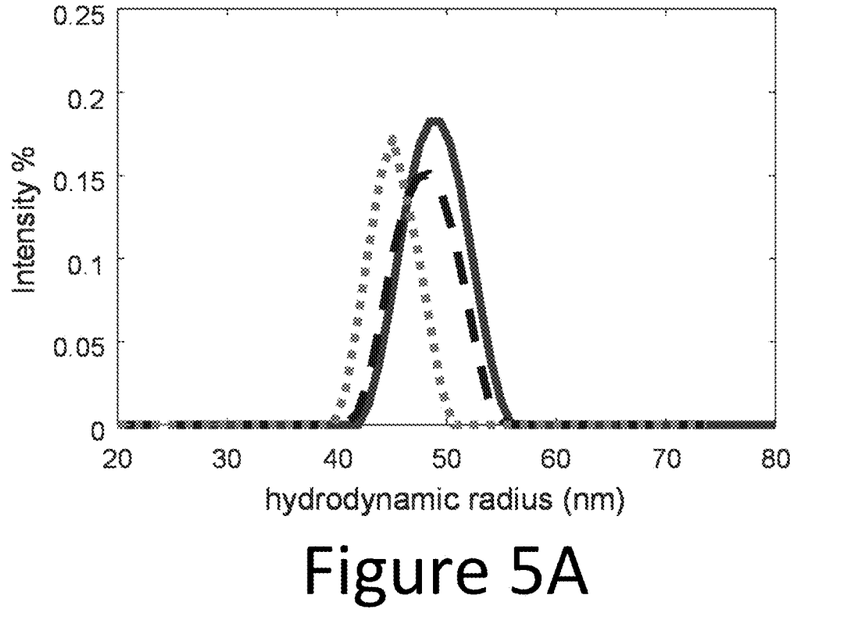
FIG. 5A shows a graph of particle size distributions in an example configuration.
Figure 5B:
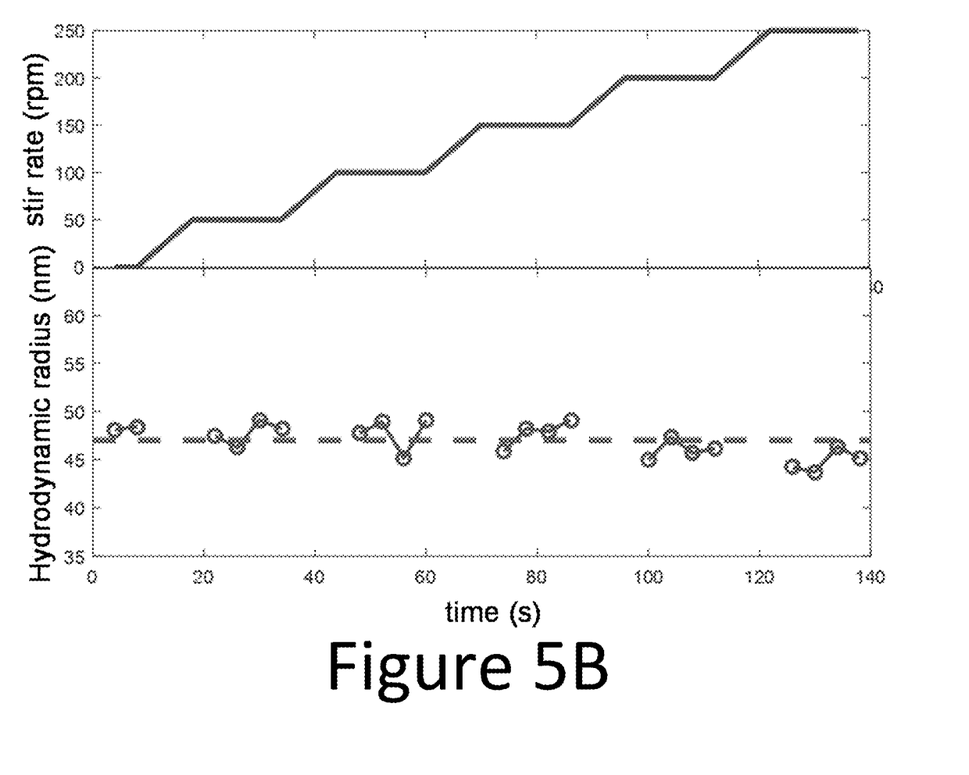
FIG. 5B shows a graph of hydrodynamic radius versus time measured in a reaction vessel whilst increasing a stir rate.

A first example is described with reference to FIG. 5A and FIG. 5B. FIG. 5A shows particle size distributions in a 1.25 mg/ml suspension of PS particles with hydrodynamic radius of 48.5 nm, measured under quiescent (0 rpm) and stirred conditions in a reaction vessel. The measurement configuration and optical system were produced as in FIG. 3 using a 15 cm diameter reaction vessel with a 4 mm thick glass window without flow guidance device, and the suspension was magnetically stirred at rates of 50-250 rpm. Reynolds numbers were in the range Re~400-1700 (laminar to weakly turbulent bulk flow). In FIG. 5A, the solid curve indicates a particle size distribution at 0 rpm, the dashed curve indicates a PSD in stirred conditions with a stir rate of 100 rpm, and the dotted curve indicates a PSD in stirred conditions with a stir rate of 250 rpm. Data were obtained from CONTIN analysis of the resulting $<g_B(\tau)>$. The data on suspension flow obtained from $G(\tau,z)$ using the disclosed analysis exhibit a laminar flow boundary layer within 1 mm optical path length in the suspension. The maximum shear rate within the layer corresponds to ~75 s$^{-1}$ for the maximum stir rate of 250 rpm. The data in FIG. 5B show a mean (Z-average) hydrodynamic radius (bottom panel) measured at 4 s intervals and analysed with the method described in the flow chart of FIG. 4 (using Cumulant analysis of $<g_B(\tau)>$) as function of time, during a ramp-stepwise increase of the stir rate in the vessel (shown in the top panel). The analysis method including flow correction robustly characterizes the size and PSD over the employed range of stir rates.

Figure 6:
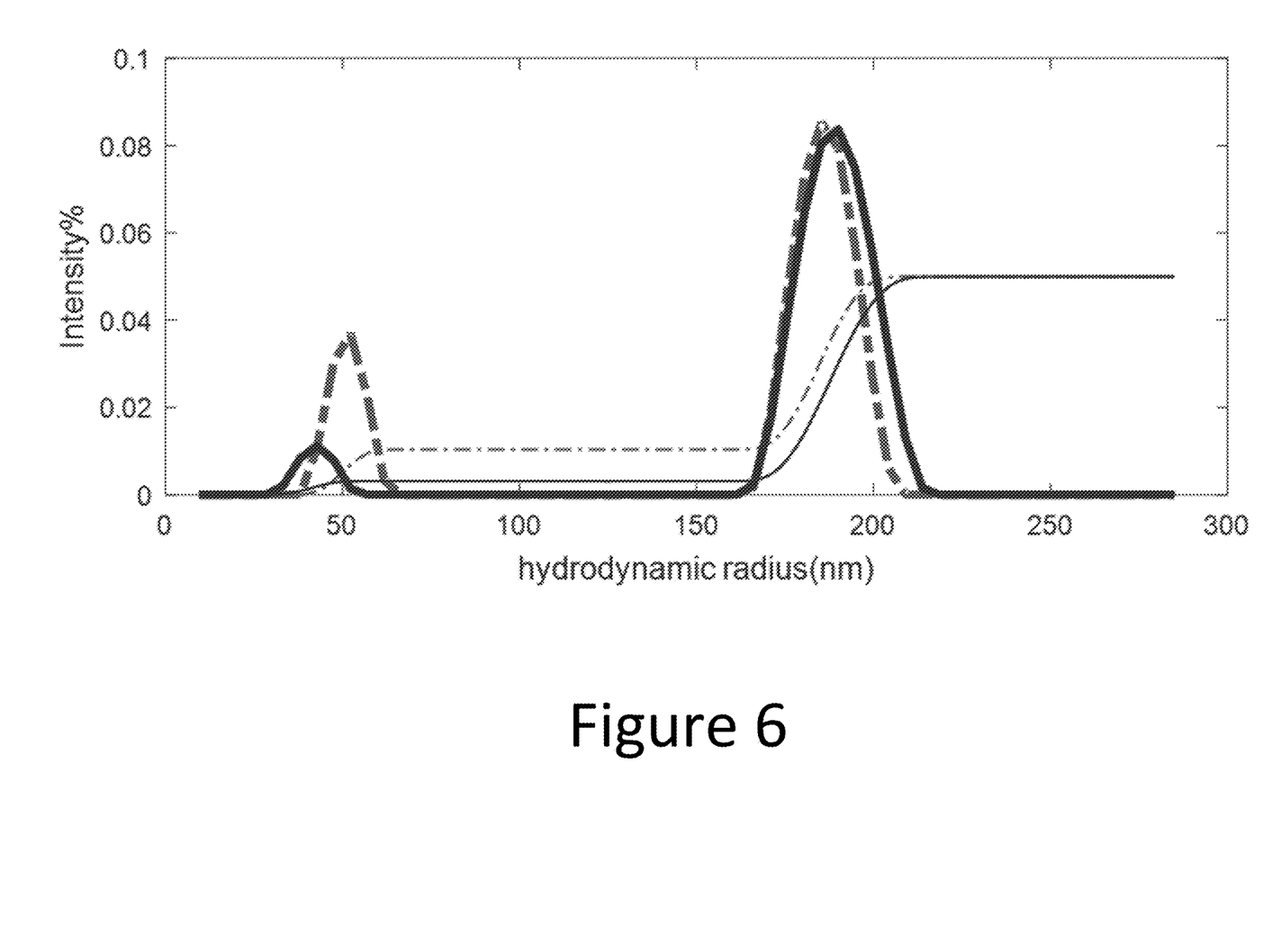
FIG. 6 shows example particle size distributions measured in a flow cell.

A second example is described with reference to FIG. 6. FIG. 6 shows particle size distributions of binary mixtures of polystyrene particles with hydrodynamic radii 49 nm/191 nm at two concentration ratios of small to large particles, A:(1.25 mg/0.07 mg)/ml and B:(1.25 mg/0.22 mg)/ml, measured under flow in a flow-through configuration. The measurement configuration and optical system were produced as in FIG. 2 with a small-scale flow cell (2 mm along the optical axis) carrying a flow of ~0.9 liter/hr generated by constant pressurization upstream. In FIG. 6, the thick dashed line shows a particle size distribution for concentration ratio A and the thin dashed line shows the corresponding cumulative distribution. The thick solid line shows a particle size distribution for concentration ratio B and the thin solid line shows the corresponding cumulative distribution. Both for concentration ratio A and B, flow speed was measured both independently and from analysis of $g_F(\tau,z)$, yielding a Poiseuille flow profile with peak velocity ~23 mm/s and maximum shear rate ~46 s$^{-1}$ near the capillary/suspension boundary. The resulting PSDs in FIG. 6 were obtained from CONTIN analysis of $<g_B(\tau)>$ for the two different relative concentrations A and B. The data (peak width, peak position and peak area ratio) are in accordance with the expected distribution based on the employed particle sizes, individual polydispersity (coefficient of variation ~<7% for each species) and employed concentration, taking into account Mie theory to account for scattering intensity.

Examples are disclosed in the following clauses.

1. A method for monitoring a property of colloidal particles in a flowing colloidal suspension, comprising providing a sample comprising a flowing colloidal suspension;

non-invasively monitoring at least one of a size and a size distribution of colloidal particles of the flowing colloidal suspension using Fourier domain, FD, low-coherence interferometry, LCI, wherein the monitoring comprises deriving a time, t, and optical path length, z, resolved LCI light scattering signal, l(t,z), from a t-resolved LCI wavelength spectrum of interference, and deriving information indicative of the at least one of the size and the size distribution of the colloidal particles from at least one of a z-resolved temporal autocorrelation function, $G(\tau,z)$, of l(t,z), in which $\tau$ represents a lag time, and a z-resolved frequency power spectrum, $\hat{G}(\omega,z)$, of l(t,z), in which $\omega$ represents a frequency.

2. The method of clause 1, further comprising:

determining, from $G(\tau,z)$, z and $\tau$-dependent decorrelation factors, $g_F(\tau,z)$ related to the flow of the colloidal suspension; and determining, from $G(\tau,z)$, z- and $\tau$-dependent autocorrelations, $g_B(\tau,z)$, representative of Brownian motion of the colloidal particles.

3. The method of clause 2, further comprising:

determining, from $G(\tau,z)$, a characteristic optical path length, $Z_{ss}$, representative of a photon mean free path in the flowing colloidal suspension, for which $g_B(\tau,z)$ for $z<Z_{ss}$ in the colloidal suspension are independent of z within a measurement noise.

4. The method of any preceding clause, further comprising:

determining, based on $g_B(\tau,z)$ for $z<Z_{ss}$ in the flowing colloidal suspension, an averaged autocorrelation function, $<g_B(\tau)>$, representative of single scattered light, and performing a photon correlation spectroscopy, PCS, analysis using $<g_B(\tau)>$ to extract the information relating to the at least one of the size and the size distribution of the colloidal particles.

5. The method of clause 1, comprising deriving, from $\hat{G}(\omega,z)$, z-resolved power spectra, $\hat{g}_F(\omega,z)$, related to the flow-induced LCI signal fluctuations, and associated z-resolved power spectra, $\hat{g}_B(\omega,z)$, representing Brownian motion induced fluctuations, and deriving from $\hat{g}_B(\omega,z)$ a z-averaged power spectrum $<\hat{g}_B(\omega)>$.

6. The method of clause 5, further comprising deriving, from $<\hat{g}_B(\omega)>$, information related to the at least one of the size and the size distribution.

7. The method of any preceding clause, further comprising performing the FDLCI using low coherence light with a central wavelength between about 300 nm and 3000 nm and using one of a swept source method or a spectral domain method, wherein the swept source method employs a swept-wavelength light source.

8. The method of any preceding clause, further comprising causing the colloidal suspension to flow at a speed of at most about 40 mm/s within an optical path length of about 3 mm from a measurement window or at shear rates of at most about 80 s$^{-1}$ within about 1 mm of the measurement window.

9. The method of any preceding clause, wherein the size or a largest dimension of the colloidal particles is between about 10 nm and 3 μm, preferably between about 15 nm and 1000 nm, and the method comprises determining at least one of the particle size and the size distribution in this particle size range.

10. The method of any preceding clause, wherein the colloidal suspension is a polydisperse suspension comprising colloidal particles with at least two sizes in a range of about 10 nm to 3 μm, preferably between about 15 nm and 1000 nm.

11. The method of any preceding clause, wherein the deriving of l(t,z) and the obtaining of the information indicative of the at least one of the size and the size distribution of the colloidal particles based on l(t,z) is repeated periodically or continuously.

12. The method of any preceding clause, wherein the deriving of the information indicative of the at least one of the size and the size distribution of the colloidal particles is performed independent of a concentration of said colloidal particles in the suspension.

13. The method of any preceding clause, further comprising controlling a process based on the determined information indicative of the at least one of the size and the size distribution of the colloidal particles.

14. The method of any preceding clause, further comprising classifying a suspension based on the information relating to the at least one of the size and the size distribution of the colloidal particles and controlling an FDLCI instrument and the monitoring based on the information indicative of the at least one of the size and the size distribution of the colloidal particles.

15. A Fourier domain, FD, low-coherence interferometry, LCI, device for monitoring a property of colloidal particles in a flowing colloidal suspension in a process, the device comprising:
a low coherence light source configured to simultaneously illuminate a reference path and a sample comprising the flowing colloidal suspension;
a means for combining light reflected from the reference path and light scattered from the flowing suspension to obtain an interference signal;
a detector configured to detect a time-resolved LCI wavelength spectrum of interference between the light reflected from the reference path and light scattered from the sample comprising the flowing suspension;
a data acquisition and processing unit configured to derive a time, t, and optical path length, z, resolved LCI light scattering signal, l(t,z), from the acquired LCI wavelength spectrum of interference, and to derive information indicative of at least one of a size and a size distribution of the colloidal particles from a z-resolved temporal autocorrelation function, $G(\tau,z)$, of l(t,z), in which $\tau$ is a lag time, or from a frequency power spectrum, $\hat{G}(\omega,z)$, of l(t,z), in which $\omega$ is a frequency;
wherein the low coherence light source is a broadband light source or a swept light source, the swept light source being a swept-wavelength light source.

16. The FDLCI device according to clause 15, further comprising a control unit configured to non-invasively monitor the at least one of the size and the size distribution of the colloidal particles in the flowing colloidal suspension, wherein the control unit is further configured to control at least one of the data acquisition and processing unit and at least one process parameter.

17. Computer-readable medium comprising instructions which, when executed by a computer, cause the computer to carry out the method of any one of clauses 1 to 14.

The invention claimed is:

1. A method for determining a property of nanoparticles in a flowing nanosuspension, comprising
providing a sample comprising a flowing nanosuspension;
non-invasively determining at least one of a size and a size distribution of nanoparticles of the flowing nanosuspension using Fourier domain, FD, low-coherence interferometry, LCI, wherein the monitoring comprises deriving a time, t, and optical path length, z, resolved LCI light scattering signal, l(t,z), from a t-resolved LCI wavelength spectrum of interference, and deriving information indicative of the at least one of the size and the size distribution of the nanoparticles from a z-resolved temporal autocorrelation function, $G(\tau,z)$, of l(t,z), in which $\tau$ represents a lag time;
determining, from $G(\tau,z)$, z and $\tau$-dependent decorrelation factors, $g_F(\tau,z)$ related to the flow of the nanosuspension;
determining, from $G(\tau,z)$, z- and $\tau$-dependent autocorrelations, $g_B(\tau,z)$, representative of Brownian motion of the nanoparticles;
determining, from $G(\tau, z)$, a characteristic optical path length, $Z_{ss}$, representative of a photon mean free path in the flowing nanosuspension, for which $g_B(\tau,z)$ for $z<Z_{ss}$ in the nanosuspension are independent of z within a measurement noise; and
determining, based on $g_B(\tau,z)$ for $z<Z_{ss}$ in the flowing nanosuspension, an averaged autocorrelation function, $<g_B(\tau)>$, representative of single scattered light, and performing a photon correlation spectroscopy, PCS, analysis using $<g_B(\tau)>$ to extract the information relating to the at least one of the size and the size distribution of the nanoparticles.

2. A method for determining a property of nanoparticles in a flowing nanosuspension, comprising
providing a sample comprising a flowing nanosuspension;
non-invasively determining at least one of a size and a size distribution of nanoparticles of the flowing nanosuspension using Fourier domain, FD, low-coherence interferometry, LCI, wherein the monitoring comprises deriving a time, t, and optical path length, z, resolved LCI light scattering signal, l(t,z), from a t-resolved LCI wavelength spectrum of interference, and deriving information indicative of the at least one of the size and the size distribution of the nanoparticles from a z-resolved temporal frequency power spectrum, $\hat{G}(\omega,z)$, of l(t,z), in which $\omega$ represents a frequency;

determining, from $\hat{G}(\omega,z)$, z-resolved power spectra, $g_F(\omega,z)$ related to the flow of the nanosuspension;

determining, from $\hat{G}(\omega,z)$, z-resolved power spectra $g_B(\omega,z)$ representative of Brownian motion of the nanoparticles;

determining, from $\hat{G}(\omega,z)$ a characteristic optical path length, $Z_{ss}$, representative of a photon mean free path in the flowing nanosuspension, for which $g_B(\omega,z)$ for $z<Z_{ss}$ in the nanosuspension are independent of z within a measurement noise; and determining, based on $g_B(\omega,z)$ for $z<Z_{ss}$ in the flowing nanosuspension, an averaged power spectrum, $<g_B(\omega)>$, representative of single scattered light, and deriving, from $<G_B(\omega)>$, information related to the at least one of the size and the size distribution of the nanoparticles.

3. The method of claim 1, further comprising performing the FDLCI using low coherence light with a central wavelength between about 300 nm and 3000 nm and using one of a swept source method or a spectral domain method, wherein the swept source method employs a swept-wavelength light source.

4. The method of claim 1, further comprising causing the nanosuspension to flow at a speed of at most about 40 mm/s within an optical path length of about 3 mm from a measurement window or at shear rates of at most about 80 s$^{-1}$ within about 1 mm of the measurement window.

5. The method of claim 1, wherein the size or a largest dimension of the nanoparticles is between about 10 nm and 3 μm, preferably between about 15 nm and 1000 nm, and the method comprises determining at least one of the particle size and the size distribution in this particle size range.

6. The method of claim 1, wherein the nanosuspension is a polydisperse suspension comprising nanoparticles with at least two sizes in a range of about 10 nm to 3 μm, preferably between about 15 nm and 1000 nm.

7. The method of claim 1, wherein the deriving of l(t,z) and the obtaining of the information indicative of the at least one of the size and the size distribution of the nanoparticles based on l(t,z) is repeated periodically or continuously.

8. The method of claim 1, wherein the deriving of the information indicative of the at least one of the size and the size distribution of the nanoparticles is performed independent of a concentration of said nanoparticles in the suspension.

9. The method of claim 1, further comprising controlling a process based on the determined information indicative of the at least one of the size and the size distribution of the nanoparticles.

10. The method of claim 1, further comprising classifying a suspension based on the information relating to the at least one of the size and the size distribution of the nanoparticles and controlling an FDLCI instrument and the monitoring based on the information indicative of the at least one of the size and the size distribution of the nanoparticles.

11. A Fourier domain, FD, low-coherence interferometry, LCI, device for determining a property of nanoparticles in a flowing nanosuspension in a process, the device comprising:

a low coherence light source configured to simultaneously illuminate a reference path and a sample comprising the flowing nanosuspension;

a means for combining light reflected from the reference path and light scattered from the flowing suspension to obtain an interference signal;

a detector configured to detect a time-resolved LCI wavelength spectrum of interference between the light reflected from the reference path and light scattered from the sample comprising the flowing suspension;

a data acquisition and processing unit configured to derive a time, t, and optical path length, z, resolved LCI light scattering signal, l(t,z), from the acquired LCI wavelength spectrum of interference, to derive information indicative of at least one of a size and a size distribution of the nanoparticles from a z-resolved temporal autocorrelation function, $G(\tau,z)$, of l(t,z), in which $\tau$ is a lag time, to determine, from $G(\tau,z)$, z and $\tau$-dependent decorrelation factors, $g_F(\tau,z)$ related to the flow of the nanosuspension, to determine, from $G(\tau,z)$, z- and $\tau$-dependent autocorrelations, $g_B(\tau,z)$, representative of Brownian motion of the nanoparticles, to determine, from $G(\tau,z)$, a characteristic optical path length, $Z_{ss}$, representative of a photon mean free path in the flowing nanosuspension, for which $g_B(\tau,z)$ for $z<Z_{ss}$ in the nanosuspension are independent of z within a measurement noise, and to determine, based on $g_B(\tau,z)$ for $z<Z_{ss}$ in the flowing nanosuspension, an averaged autocorrelation function, $<g_B(\tau)>$, representative of single scattered light, and perform a photon correlation spectroscopy, PCS, analysis using $<g_B(\tau)>$ to extract the information relating to the at least one of the size and the size distribution of the nanoparticles;

wherein the low coherence light source is a broadband light source or a swept light source, the swept light source being a swept-wavelength light source.

12. A Fourier domain, FD, low-coherence interferometry, LCI, device for determining a property of nanoparticles in a flowing nanosuspension in a process, the device comprising:

a low coherence light source configured to simultaneously illuminate a reference path and a sample comprising the flowing nanosuspension;

a means for combining light reflected from the reference path and light scattered from the flowing suspension to obtain an interference signal;

a detector configured to detect a time-resolved LCI wavelength spectrum of interference between the light reflected from the reference path and light scattered from the sample comprising the flowing suspension;

a data acquisition and processing unit configured to derive a time, t, and optical path length, z, resolved LCI light scattering signal, l(t,z), from the acquired LCI wavelength spectrum of interference, to derive information indicative of at least one of a size and a size distribution of the nanoparticles from a z-resolved temporal frequency power spectrum, $\hat{G}(\omega,z)$, of l(t,z), in which $\omega$ represents a frequency, to determine, from $\hat{G}(\omega,z)$, z-resolved power spectra, $g_F(\omega,z)$ related to the flow of the nanosuspension, to determine, from $\hat{G}(\omega,z)$, z-resolved power spectra $\acute{g}_B(\omega,z)$ representative of Brownian motion of the nanoparticles, to determine, from $\hat{G}(\omega,z)$, a characteristic optical path length, $Z_{ss}$, representative of a photon mean free path in the flowing nanosuspension, for which $g_B(\omega,z)$ for $z<Z_{ss}$ in the nanosuspension are independent of z within a measurement noise, and to determine, based on $g_B(\omega,z)$ for $z<Z_{ss}$ in the flowing nanosuspension, an averaged power spectrum, $<g_B(\omega)>$, representative of single scattered light, and deriving, from $<g_B(\omega)>$, information related to the at least one of the size and the size distribution of the nanoparticles;

wherein the low coherence light source is a broadband light source or a swept light source, the swept light source being a swept-wavelength light source.

13. The FDLCI device according to claim 11, further comprising a control unit configured to non-invasively monitor the at least one of the size and the size distribution of the nanoparticles in the flowing nanosuspension, wherein the control unit is further configured to control at least one of the data acquisition and processing unit and at least one process parameter.

14. Computer-readable medium comprising instructions which, when executed by a computer, cause the computer to carry out the method of claim 1.

15. The method of claim 2, further comprising performing the FDLCI using low coherence light with a central wavelength between about 300 nm and 3000 nm and using one of a swept source method or a spectral domain method, wherein the swept source method employs a swept-wavelength light source.

16. The method of claim 2, further comprising causing the nanosuspension to flow at a speed of at most about 40 mm/s within an optical path length of about 3 mm from a measurement window or at shear rates of at most about 80 $s^{-1}$ within about 1 mm of the measurement window.

17. The method of claim 2, wherein the size or a largest dimension of the nanoparticles is between about 10 nm and 3 μm, and the method comprises determining at least one of the particle size and the size distribution in this particle size range.

18. The method of claim 2, wherein the nanosuspension is a polydisperse suspension comprising nanoparticles with at least two sizes in a range of about 10 nm to 3 μm.

19. The method of claim 2, wherein the deriving of l(t,z) and the obtaining of the information indicative of the at least one of the size and the size distribution of the nanoparticles based on l(t,z) is repeated periodically or continuously.

20. The method of claim 2, further comprising controlling a process based on the determined information indicative of the at least one of the size and the size distribution of the nanoparticles.

* * * * *